(12) United States Patent  
Xu (10) Patent No.: US 9,171,085 B2  
(45) Date of Patent: *Oct. 27, 2015

(54) PERSONALIZED PROFESSIONAL CONTENT RECOMMENDATION

(71) Applicant: UT-Battelle, LLC, Oak Ridge, TN (US)

(72) Inventor: Songhua Xu, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 159 days.

This patent is subject to a terminal disclaimer.

(21) Appl. No.: 13/960,509

(22) Filed: Aug. 6, 2013

(65) Prior Publication Data

US 2013/0325858 A1 Dec. 5, 2013

Related U.S. Application Data

(63) Continuation-in-part of application No. 13/785,117, filed on Mar. 5, 2013.

(60) Provisional application No. 61/607,800, filed on Mar. 7, 2012.

(51) Int. Cl.  
*G06F 17/30* (2006.01)

(52) U.S. Cl.  
CPC .... *G06F 17/30867* (2013.01); *G06F 17/30699* (2013.01)

(58) Field of Classification Search  
CPC ..................... G06F 17/30699; G06F 17/30867  
USPC .......................................................... 707/754  
See application file for complete search history.

(56) References Cited

U.S. PATENT DOCUMENTS

| 6,438,579 | B1* | 8/2002 | Hosken ..................... 709/203 |
| 8,930,393 | B1* | 1/2015 | Nordstrom et al. ........... 707/767 |
| 2006/0224552 | A1* | 10/2006 | Riezler et al. ................ 707/1 |
| 2007/0106656 | A1* | 5/2007 | Gutta ............................ 707/5 |
| 2009/0132453 | A1* | 5/2009 | Hangartner et al. ........... 706/46 |
| 2009/0138509 | A1* | 5/2009 | Hind et al. .................. 707/104.1 |
| 2009/0248494 | A1* | 10/2009 | Hueter et al. .................. 705/10 |
| 2010/0250578 | A1* | 9/2010 | Athsani et al. ................ 707/765 |
| 2010/0281427 | A1* | 11/2010 | Ghosh et al. .................. 715/811 |
| 2010/0312369 | A1* | 12/2010 | Dollar, Jr. ....................... 700/94 |
| 2011/0295843 | A1* | 12/2011 | Ingrassia et al. .............. 707/723 |

OTHER PUBLICATIONS

Abstract entitled "Mining User Dwell Time for Personalized web Search Re-Ranking", by Xu et al., dated Jan. 1, 2011.*

(Continued)

*Primary Examiner* — Mahesh Dwivedi  
(74) *Attorney, Agent, or Firm* — Brinks Gilson & Lione (57) ABSTRACT

A personalized content recommendation system includes a client interface configured to automatically monitor a user's information data stream transmitted on the Internet. A hybrid contextual behavioral and collaborative personal interest inference engine resident to a non-transient media generates automatic predictions about the interests of individual users of the system. A database server retains the user's personal interest profile based on a plurality of monitored information. The system also includes a server programmed to filter items in an incoming information stream with the personal interest profile and is further programmed to identify only those items of the incoming information stream that substantially match the personal interest profile.

20 Claims, 5 Drawing Sheets

(56) References Cited

OTHER PUBLICATIONS

Article entitled "A User-Oriented Webpage Ranking Algorithm Based on User Attention Time", by Xu et al., dated 2008).*

Clukey, Steven et al., "Recommending Images of User Interests from the Biomedical Literature," Proc. of SPIE vol. 8674, 2013, pp. 86740G-1-8-6740G-9.

* cited by examiner

PERSONALIZED PROFESSIONAL CONTENT RECOMMENDATION

RELATED APPLICATION

This application is a continuation-in-part of U.S. patent application Ser. No. 13/785,117 filed Mar. 5, 2013, and titled "Recommending Personally Interested Content by Text Mining, Filtering, and Interfaces", which claims the benefit of priority of U.S. Provisional Pat. App. No. 61/607,800 filed Mar. 7, 2012 and titled "Recommending Personally Interested Contents by Text Mining, Filtering, and Interfaces," both of which are incorporated by reference.

STATEMENT REGARDING FEDERALLY SPONSORED RESEARCH AND DEVELOPMENT

This application was made with United States government support under Contract No. DE-AC05-00OR22725 awarded by the United States Department of Energy. The United States government has certain rights in these inventions.

BACKGROUND

1. Technical Field

This disclosure relates to text mining and content recommendations through an automated analysis.

2. Related Art

Search engine rankings may provide information about selected topics or answer specific questions. Unfortunately some search engines cannot return the latest information about a topic or question when that information has not had sufficient time to establish its cyber reputation or recognition of relevance to users' information needs. Additionally, many Web search services require users to compose their own Web queries. To receive sought-after information, the search engines require the users to ask the right questions and convey those questions using a pre-chosen query language following a specific query structure. Besides its counter-intuitive nature, such queries directed to sought-after information may not exist.

Unfortunately, most of the search engines do not offer an integrated experience of one stop information shop for any user. Unlike known technologies, the technology disclosed in the Detailed Description that follows, un-intrusively observes the user's own information consumption behaviors in time, automatically infers that user's information interests, and proactively recommends personally high-value content for the user under a given context of a certain information consumption mode of the user (such as 9 am Monday morning, later Sunday afternoon, or during Christmas holidays). Some of the systems described in the Detailed Description do not require a more tactic query formulation or manual information searching and end-user filtering. The new technology discloses recommendation techniques and focuses on proactively delivering relevant content to an end user in a personalized way.

BRIEF DESCRIPTION OF THE DRAWINGS

Appendices 1-6 describe a personalized re-ranking algorithm.

DETAILED DESCRIPTION OF THE PREFERRED EMBODIMENTS

Figure 1:
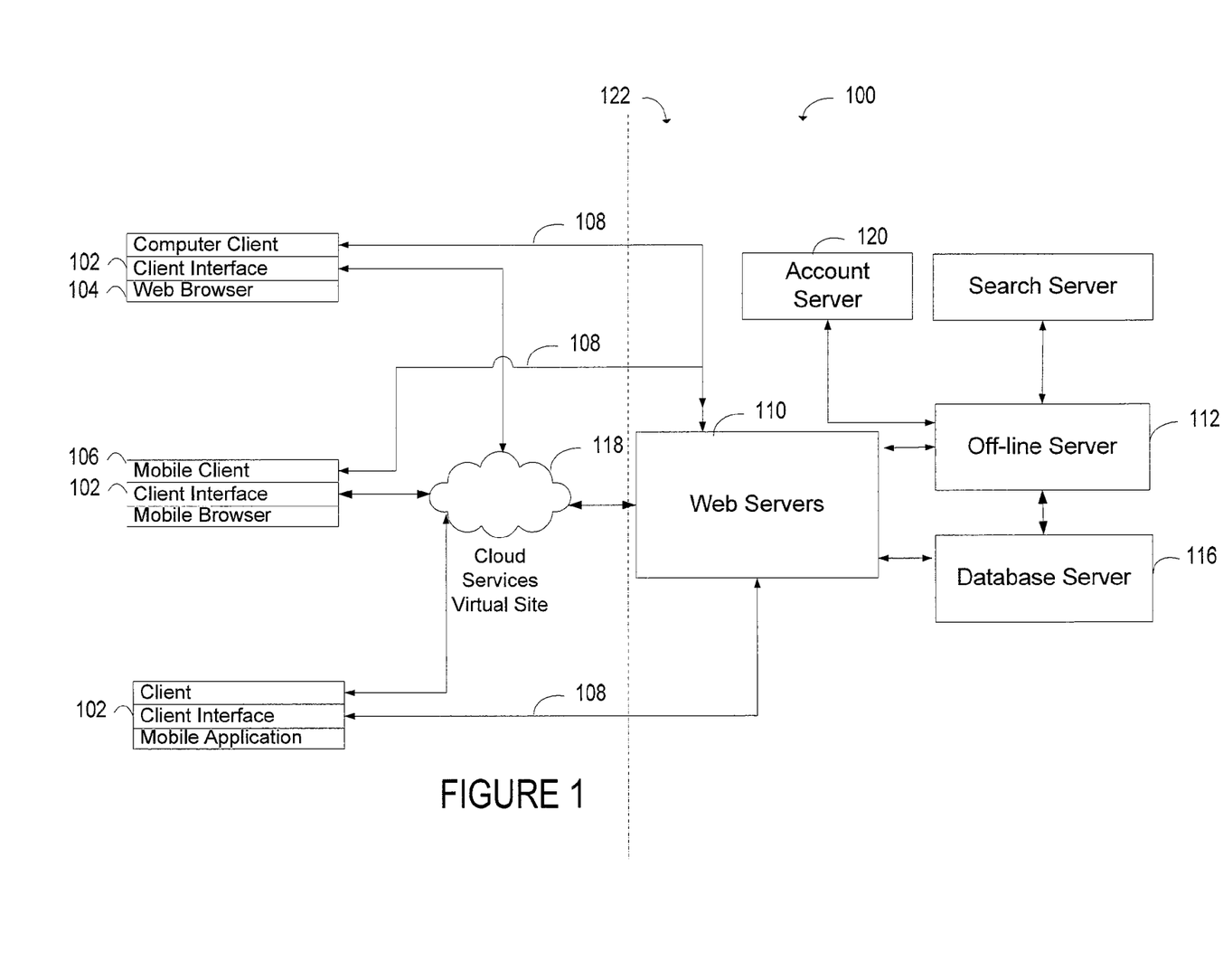
FIG. 1 is a block diagram of an exemplary architecture.

The disclosed customized system 100 shown in FIG. 1 includes front end client interfaces (or client interface devices) 102 that may run on an array of remote clients through a background processing. Some front end client interfaces 102 are embedded in hardware allowing the system 100 to directly connect to other front end system buses. Alternative front end client interfaces 102 comprise software, applications, or plug-ins that are integrated into larger software applications such as a Web browser 104 that resides on a client device in a client/server architecture. The client interfaces 102 may be retained in a non-transient media and may be executed on one or multiple smart phones, stationary computing devices, or mobile computing devices 106 or platforms that may execute Windows OS, Apple/Macintosh OS, Linux OS, iPad OS, iPhone OS, Android OS, and other operating systems (OSs). The front end client interfaces 102 may render the same look and feel and possess the same functionality that captures user operations and activities (e.g., user events) when a user is accessing and/or consuming content from remote content providers. Exemplary user events 202 (shown in FIG. 2) may occur during online reading, browsing, writing, and/or navigation. The front end client interfaces 102 record a time stamped user behavior record in the user device's local cache. A user event may also occur when a user opens, closes, scrolls within, and/or zooms in/out of a particular part of content in a computer rendered document, object, or file that may be displayed on a visual output device. In other words, a user event may be an action or occurrence generated by a user, to which a program might respond, for example, key presses, button clicks, a gesture on a touch sensitive display or mouse movements. The document or file affected by the user event may comply with an electronic document specification such as the TXT, PDF, DOC, DOCX, PPT, PPTX, or HTML file format.

Some front end client interfaces 102 may capture other time stamped user events too such as executing a file saving routine, a forwarding routine, a bookmarking routine, a printing routine, switching between active and inactive windows in one or multiple window-based programs, typing, physical or manual gestures, hand strokes, and/or other user actions performed on the computing device. Through a multi-task process, the client interfaces 102 may extract a portion of the consumed content that is currently under view by the user and the address of the consumed content (e.g., Uniform Resource Locator or URL). The consumed content may comprise a parsed Hypertext Markup Language (HTML) file or a PDF or Word or TXT file that may be substantially free of content relevant to the user's personal information interests such as ads, navigation bars, tags, redirection links, navigation links, etc., that are detected and removed through one or more front end client filters on the client device that are file format dependent (e.g., advertisement content filters for HTML files). The content filters may run on the client device and/or on backend servers.

Through a parallel processing with the consumed content extracted, the front end client interfaces 102 may request or extract a content signature (through a process executed on a cloud based computing platform 118 although it can also be executed on other platforms in alternative systems) for the parsed text currently under view or editing by the user. Such a content signature may include multiple semantically salient content elements embodied in the text, the address of the content, and respective densities of semantic topics embodied in the text, whose detection methods are executed by the system and methods described in the Appendices or in U.S. Provisional Pat. App. No. 61/607,800, which is incorporated by reference. A cloud or cloud based computing platform 118 may refer to a scalable platform that provides a combination of services including computing, durable storage of both structured and unstructured data, network connectivity, and other services. Metered services provided by a cloud or cloud based computing platform 118 may be interacted with (provisioned, de-provisioned, or otherwise controlled) via one or more front end client interfaces 102.

Consumed content at the screen snapshot level may be identified through a comparison of time stamps of adjacent snapshots. If a time difference between two user events lies within an interval the system 100 may infer a user's content consumption. The duration needs to be within a certain reasonable range to establish a user's interaction with a piece of content. For example, the duration may have a lower limit or low threshold that establishes that a user is viewing content (e.g., rather than just passing through it) and an upper limit or high threshold that may establish that a user is not ignoring the content or absent from actively consuming the content (e.g., walking away from the computer for a while). In these systems the limits that define the durations may be tunable or adaptable (e.g., programmable) to a user's information browsing or consuming behavior and in some instances, may also reflect if the content is focused. In other words, if received content is fully or partially occluded (e.g., defocused), such as when a portion of the rendered content is entirely or partially blocked by an active window in a windows-based environment, the content may be designated not consumed by appending or corresponding an inactive status identifier to its immediately previous time stamp. When the received content regains focus, in other words it is re-displayed in an active window the content may be designated active at that instance by appending or corresponding an active status identifier to its counterpart time stamp in another snapshot.

As a content signature is generated, it is appended to the corresponding time stamped user behavior record and to the parsed file (e.g., a parsed HTML file) to render a snapshot. The snapshots, also known as contextual user information consumption behavior data, short for contextual user behavior data, may be encrypted with an encryption validation code at the client and periodically transmitted to a perimeter network that may include a Web server or cluster 110 linked to the front end client interfaces 102 through a publicly accessible distributed network 108. A server may refer to one or more computers and/or programs stored on a non-transient media that respond to commands received from the client devices or applications. In some systems and processes it is a machine or software application's role that establishes it as a server.

Figure 2:
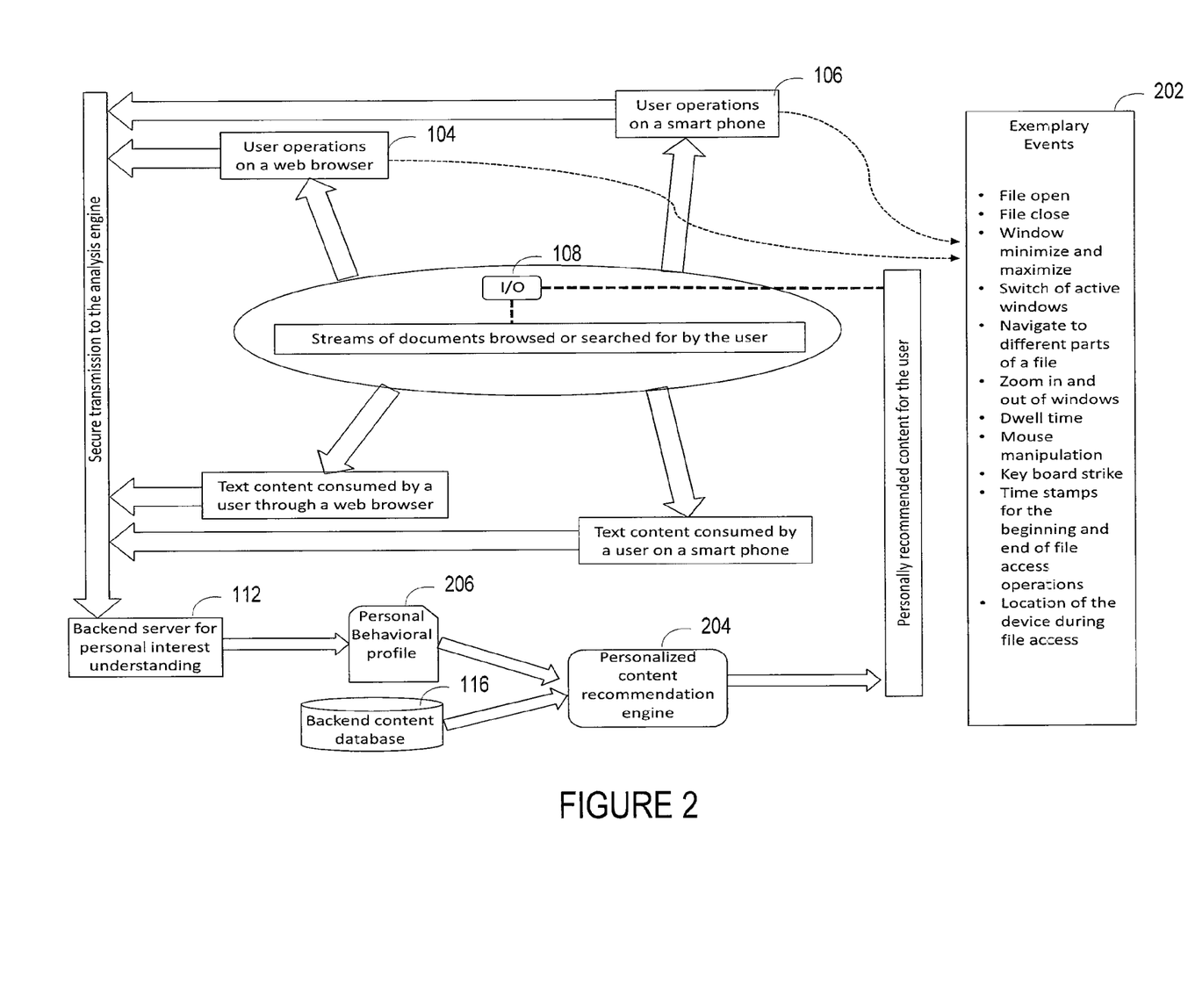
FIG. 2 is a functional diagram of an exemplary process.
Figure 3:
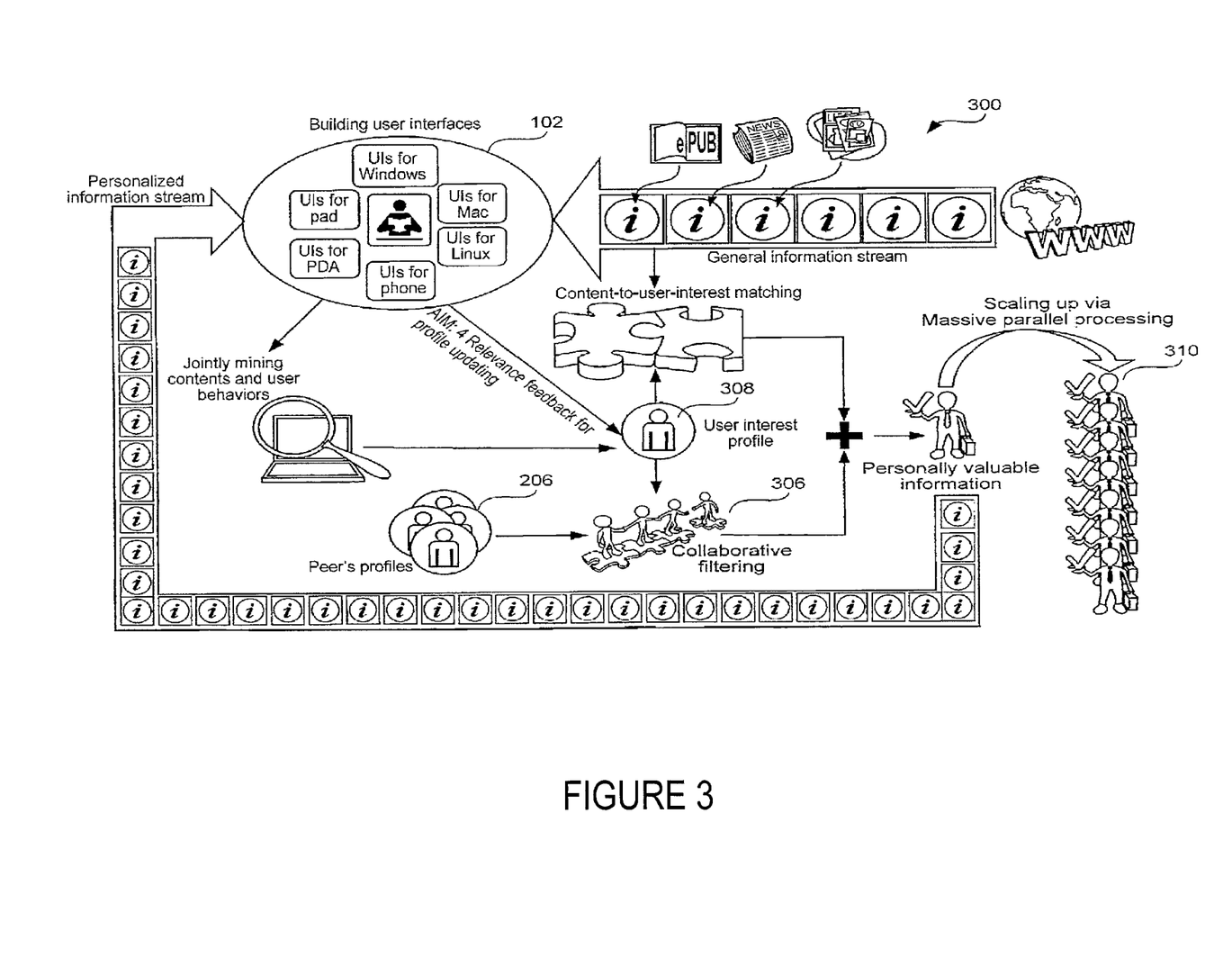
FIG. 3 is an alternative functional diagram of an exemplary process.

In some systems, transmissions occur according to an incremental schedule. Initially, snapshots may be transmitted in real time. A real time process may match a human's perception of time or a virtual process that is processed at the same rate (or perceived to be at the same rate) as a physical or an external process. This may occur as user interest profiles are first created or the snapshots demonstrate a strong shift in the user's interest. As personal interest profiles 308, 206 (stored in a memory or the database server 116) are established and are substantially unchanging (e.g., within three standard deviations of an existing profile, for example), transmissions from the front-end client interfaces 102 may decline and may occur according to a batch schedule. When network connections are lost, snapshots are buffered on the client device until the network connection is restored that may occur through a callback. A callback may comprise a scheme where a connection or a recommending session is broken and a subsequent connection or recommending session is automatically or manually re-established to facilitate additional data interchanges between the front end client interfaces 102 and the Web server or cluster 110.

Upon verification of the encryption validation code, the perimeter network and Web server 110 will direct the front end client interfaces 102 or the Web browser 104 it may plug into to clear the client side cache by transmitting a command, an acknowledgement through the publicly accessible distributed network 108, or through cache control directives. An off-line server 112 isolated from the front end client interfaces 102 may automatically query the Web server 110 asynchronously or on a periodic schedule through an intervening firewall and private network like a Local Area Network (LAN). Upon initiation of the query, a connection channel may be established with the perimeter network and Web server 110 to receive snapshots, which may then be removed from or made inaccessible to the Web server 110 so that only the off-line server 112 and a database server 116 store the snapshots and any associated files in a record pool. The off-line server 112 controls the timing and activation of the transfer of the snapshots to the database server 116 via the private LAN to minimize the risk and exposure to untrusted networks and compromised systems. The private network is configured to support high volume traffic with the perimeter network and the back end systems 122.

To better deliver relevant content to the user without having the user manually express his/her interests through search queries, the contextual user behavior data are parsed to generate the personal interest profiles 308, 206. A recommendation engine 204 resident to the off-line server 112 detects topic phrases that comprise one or more words, their frequencies and durations within a snapshot. If a user consumes content through multiple devices, using multiple browsers and front end client interfaces 102, operating on similar or disparate operating systems, the snapshots are linked together according to the timestamps, integrated into a single user record pool and processed individually. In one implementation each topic phrase is associated with a salience score that indicates the user's interest in a particular phrase under a certain context of the user's information consumption mode as well as spatial and temporal conditions, such as holiday mode at home or outside, Monday morning office mode in field or at office, or vacation mode at home or on the road.

The recommendation engine's 204 conversions from the phrase level to an object (e.g., an entity exchanged), page, or document level may consider multiple aspects including those systems and methods described in U.S. Provisional Pat. App. No. 61/607,800, in which concept words in the Provisional Patent Application (and Appendices 1-6) refer to the term "topic phrases" as used in this disclosure. In addition to those systems and methods, alternative aspect may be the frequency of an individual phrase of interest that may have a relatively high salience score. A document containing two interest points may be given more weight than a document having one interest point provided that the semantic relations between the interest points are distinguishable and the interest points represent discriminative concepts. Phrase inhibitors (e.g., avoided topic phrases) and saturation topic phrases (e.g., occurrences in an object that are beyond a user's point of interest) are given weight in some processes, just as the source of the content (e.g., originating from a government source such as the USPTO patent site; a corporate source, etc.); the user's preferred sources (e.g., prefers US news to British BBC news), the timing of a user's request (e.g., morning, afternoon, evening, day of the week, etc.); a user's location (e.g., via a Global Positioning Service (GPS) the system may identify whether the user is at home or on vacation), the user's consumption mode, and/or etc. may also contribute to a document's utility score or a priority score that establishes the ranking, or relevance of the document to the user's information needs at a particular moment. Higher utility scores or priority scores for objects and/or documents (when compared to each other) may reflect that some objects and/or documents include content that is designated well-matched with the personal interest of a user. A user's information consumption mode in some systems 100 may comprise a user's designation that occurs at the front end client interfaces 102 that tags requests or queries to a classification, such as school classification, social classification, work classification (e.g., a working mode may include: job1, job2, etc.), religious classification, or other classification.

An exemplary document or object (referred to as document) scoring process may establish $C_a$ as the corpus comprising a set of documents authored or related to a person a, and $C_{a,i}$ as the set of documents having a person-document distance of i with respect to the particular person a. In particular, $C_{a,0}$ is the set of documents written by or directly related to the person a, e.g. a journalist's interview about the person. Also, let $C_{a,i}^{(s)}$ be the set of documents that have a distance i to the person a and contain the itemset s. Finally, let D be the document, page, or object (referred to as the document) to be scored, where a document is characterized as the set of all its frequent itemsets, so that $\{s|s\in D\}$ is the set of all frequent itemsets in the document D.

The normalized distance of a document D to the person a is given by:

$$\theta(a, D) \triangleq 2\left(\frac{1}{1 + e^{-\beta dis(a,D)}} - \frac{1}{2}\right)$$

where dis(a, D) is the absolute person-document distance from a to any author or subject owner of the document D, and β is a model parameter. In other words, θ(a, D) derives the person-document distance. Given the distance between a person a and a document D, the system may construct a corpus of documents that are related to the person in one or multiple domains or background scopes.

The normalization factor for a frequent itemset s in a given document D is $$Nf(s, D) \triangleq \theta(a, D) \sum_{s \in D} sup^\alpha(s, D)$$

where α is a model parameter and sup(s, D) is the support of an itemset s in a document D (i.e., the number of times s occurs in D). So the larger sup(s, D) implies the more times s appears in the document D.

The salience weight of a given itemset s with respect to a person a is given by $$w(s, a) = \frac{|\{D \mid D \in C_a^{(s)}\}|}{|\{D \mid D \in C_a\}|} \sum_{D \in C_a} \frac{sup(s, D)}{Nf(s, D)}$$

In the first term $$\frac{|\{D \mid D \in C_a^{(s)}\}|}{|\{D \mid D \in C_a\}|},$$

the numerator represents the number of documents that contain the itemset s and relate to the person a while the denominator represents the total number of documents relevant to the person a. The second term $$\sum_{D \in C_a} \frac{sup(s, D)}{Nf(s, D)}$$

represents the normalized support of the itemset s in the document set $C_a$, i.e. in all the documents relating to the person a.

The salience weight of the itemset s with respect to a particular document being scored D is $$tf\_idf(s, D) \triangleq \frac{sup(s, D)}{Nf(s, D)} \cdot \log_{10}\left(\frac{|\{D \mid D \in C\}|}{|\{D \mid D \in C_a\}|}\right).$$

tf_idf(s, D) characterizes the salience of an itemset s in a document D.

The density of the itemset s in the document corpus relating to the person a is $$\rho_a(s, C_a) = \frac{1}{|\{D \mid D \in C_a\}|} \sum_{D \in C_a} \frac{sup(s, D)}{Nf(s, D)}$$

and the density of the itemset s in the entire document corpus is $$\rho_C(s, C) = \frac{1}{7} \sum_{i=0}^{6} \sum_{D \in C_{a,i}} \frac{sup(s, D) \cdot \theta(a, D)}{Nf(s, D)}.$$

So the relative salience of the itemset s with respect to the person a and a background document corpus C is $$v(s, a, C) \triangleq \frac{\rho_a(s, C_a)}{\rho_C(s, C)},$$

which is the density of the itemset s among the document corpus relevant to the person a divided by the density of the itemset among the background document corpus C. This term characterizes the person a's relative interest level for the itemset s with respect to the community's interest level as reflected by the background document corpus C for the same itemset s. The community level interest is represented by the denominator in the above equation. In other words, a user's absolute interest level is discounted by the community's interest in the same itemset.

Using these definitions, an exemplary salience score of the document D with respect to a person a and background corpus C may be expressed as:

$$\psi(D, a, C) \triangleq \sum_{s \in D} [w(s, a) \cdot \text{tf\_idf}(s, D) \cdot v(s, a, C)].$$

Meaning the candidate document is ranked according to three terms or channels. The first term or channel w(s,a) is the salience weight of an arbitrary itemset s with respect to the person a. The second term or channel tf_idf (s, D) represents the salience weight of the itemset s in the document D. The third term or channel v(s, a, C) is the itemset s's relative salience with respect to the person a and the background document corpus C. Finally, by considering the influence of all the frequent itemsets contained in the document D, we can derive the document D's salience score with respect to the person a and the background document corpus C.

The relevant content delivered to the user devices may originate from many sources including caching proxies and surrogates. Originally, the content may be harvested from a back end content corpus acquired by an automated spider or bot executed through web crawling threads performed on the web server(s) 110. Alternatively, the searched content may be generated by a search service provider such as Google®, Bing®, or Yahoo® that may independently harvest information. The top content or documents, such as those identified by documents' utility or priority scores, may be recommended to the user through the content recommendation engine 204 and internal or external network. The result may be rendered through user devices through a hierarchical sequence with a priority-based display order so that content having higher utility scores is presented before lower scored content or the content may be presented through some other priority scheme such as taking the diversity between content into consideration when determining the content display order.

To maintain privacy and increase the relevance of content delivery, users may access and edit their own personal interest profiles by logging into the system. Through a remote graphical user interface (GUI) resident to the client devices, users may view the relevance of selected topic phrases to other topic phrases associated with their accounts. Some GUIs allow users to access and edit their interest profiles through social networks like Google®, Facebook®, Twitter®, LinkedIn®, and others that create user accounts and provide authentication services. Once authenticated, users may modify or delete phrases individually, by topic, or by group. Behavioral profiles may also be modified or automatically generated through email addresses, employment, and affiliation information. When an email address, employment, or affiliation information is received, the account server 120 may automatically retrieve content through an automated program that searches a publicly accessible distributed network like the Internet for content associated with the email address, employment, or affiliation information to modify or create personal interest profiles 308, 206. For example, the account server may automatically harvest information from a user's homepage, a previous speech, blogs, or prior publications. The system may leverage such content to augment the captured information identified as relevant to the user.

In alternative systems and processes content recommendations are not made solely according to a single personal interest profile. In this alternative shown in FIG. 3 users having similar profiles are aggregated into a virtual "hyper user" profile 308 stored in a memory or the account server 120 through a user-based collaborative filtering of a plurality of personal interest profiles 308, 206 executed through the off-line server 112. The collaborative filter 306 is resident to a non-transient media that is accessible and executable by the off-line server 112. The collaborative filter 306 that may comprise a collaborative personal information interest inference engine generates automatic predictions (filtering) about the interests of a user by collecting preferences from many users (collaborating). The engine may comprise a processor or a portion of a program retained in a non-transient media that determines how the program processes the personal interest profiles. The hyper user profile 308 may bridge behavior data from one real user to another real user of close resemblance and serve as a sample user to avoid highly redundant computation repeatedly performed for each user. The hyper user profile 308 may then be used to rank content with the highest rated content being delivered to the user through the Web servers 110, publicly accessible distributed network 108, and optionally through the front end client interfaces 102. Based on the user feedback, some customized systems and processes, executed also on the server 112, automatically monitor and detect whether and when a user's interests exhibit a statistically significant shift, upon which the system automatically updates the inferred personal interest profile of the user and may assign the user to a statistically different hyper user profile 308. Some customized systems and processes executed on the server 112 are dynamically and autonomously self-tuning and are sensitive to changes in each user's interest and drift.

To optimize system run-time efficiency and minimize computational overheads a parallel computing architecture 310 is implemented to increase the throughput of the system 100. For each user group represented by a hyper user profile 308, computation may be executed independently from other groups and loads balanced through load balancers.

Figure 4:
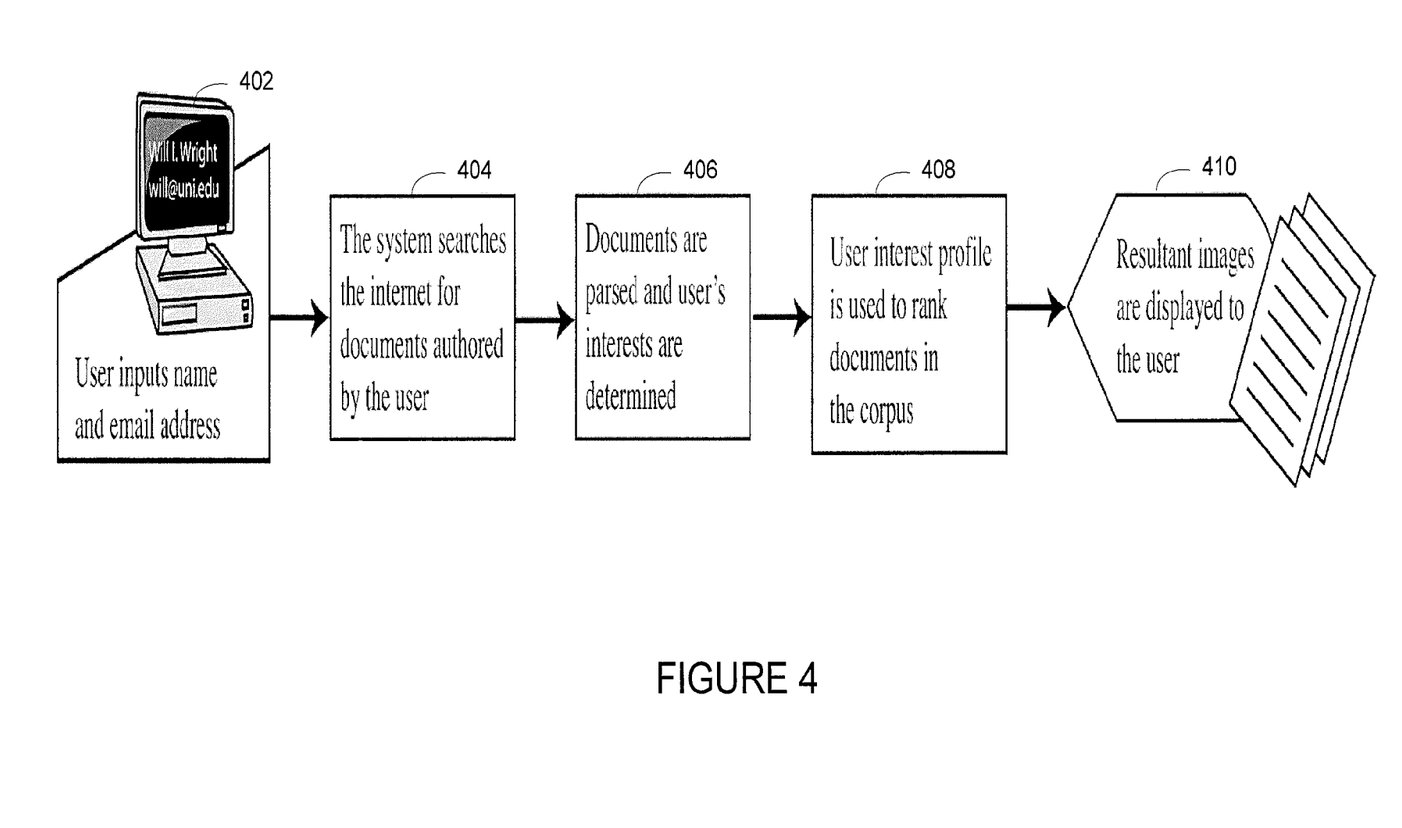
FIG. 4 is an exemplary pipelined system.

In some systems and processes (referred to as the system), recommendations are created through a pipeline that automatically determines the interests of a professional user, and extracts the most relevant content from a corpus of documents as shown in FIG. 4. The system detects and follows the pre-existing information footprint of a given user accessible through a publicly accessible distributed network like the Internet. When a user is identified the system collects and mines pre-existing information on one or more targeted subjects. A user may be initially identified by name, an email address, an affiliation, employment, employment history, education, or another attribute or indicia that may discriminate a user from other users at 402. In some systems, the more user information available to and accessible to the system, the more relevant the delivered contents may be to that user.

Once a user is identified, the system automatically searches and mines the Internet for information related to the targeted subject(s) of the user at 404. With little or no human actuation, information is mined from a range of sources accessible through the network and may comprise publications, electronic mails, academic sites, blogs, podcasts, wiki, websites, and applications used for social networking and other platforms used to publish, converse, and share content online, for example. The system collects the information which is represented through one or more documents. In FIG. 4, a document is a digital representation of an information object or an object representing a person's thinking, opinions, expressed interests, etc.

A server or cluster (referred to as a server) analyzes the documents and mines the documents to determine the user's interests at 406. When information is attributed to multiple users or persons, some systems may extract all of the relevant information about each of the users or persons attributed to that information and rank their likely attention to the information. Alternative systems may rank a user's attention based on the person's position in an author list of his/her publication. The system may also analyze a user's interest based on the aggregation of all of the documents in relation to a given subject. Through this process, the system detects, develops, and constructs a personal interest profile 308, 206 with little or no human actuation. Some personal interest profiles 308, 206 comprise a cache of objects that represent topics and topic combinations that represent the interest level of the user and the disinterest level of the user and in some systems model the temporal evolution of the user's interest level and/or disinterest level. A cache comprises a portion of memory that can be accessed quickly. Through the detection of the document's age, some systems render a time and/or temporally conscious representation (that may be stored as multiple objects) of the user in time or at a user selectable predetermined time period. Some systems allow users to request or to study the work of a user on a particular subject, in a particular time period which may show how one or more personal interest profiles 308, 206 shift when submitting a query through an interface.

In some systems personal interest profiles 308, 206 may comprise representations of a subject or topic, a combination of subject or topics, an interest and/or disinterest score of that user on each subject or topic, and optionally counts one or more temporal dimension objects associated with the time periods in which the user interest in the topics was shown or disseminated. In some systems, personal interest profiles 308, 206 may include similar subjects and topics and/or combinations with different interest and/or disinterest scores associated with different time periods.

Figure 5:
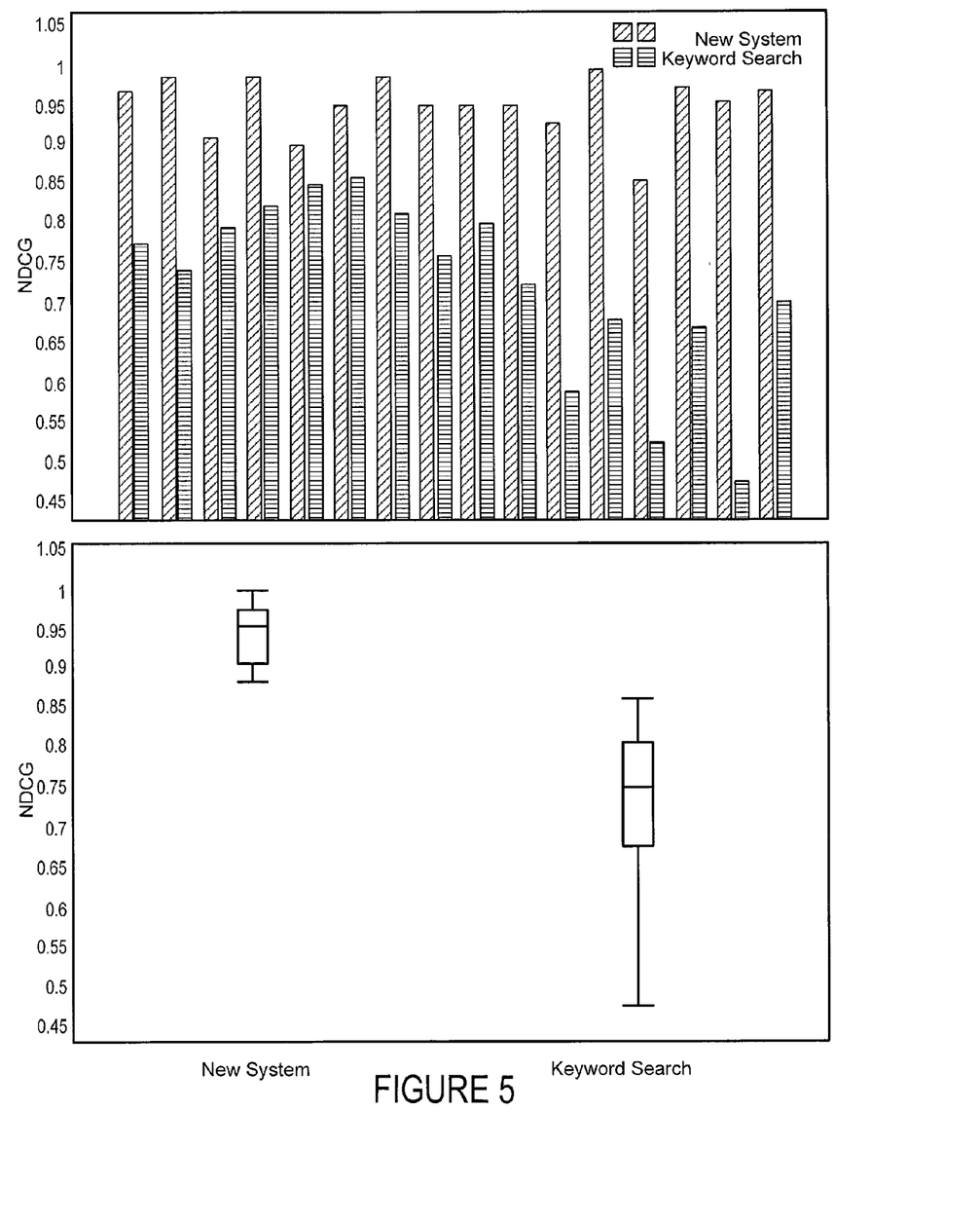
FIG. 5 is a comparison of the system to a keyword search system.

Once the content of the documents is mined to render or modify a user's personal interest profiles 308, 206, the user's personal interest profiles 308, 206 are compared to the documents that comprise the corpus, and the most relevant documents are located and are transmitted to the user at 408 and 410. The results may be generated and presented in a list or categorized on a web page and directly accessed through a hypertext link or trail via a graphical user interface. In some systems the list (e.g., document list) may be based on a numerical weighting that measures the relative importance of the documents that comprise the result to user's personal interest profile 308, 206. As shown in FIG. 5, a normalized discounted cumulative gain (NDCG) measure shows that the system can accurately determine the interests of a user and locate content that is relevant to the user more effectively than keyword-based search engines. The box plots show that system (designated the New System in FIG. 5) converges in a higher percentile and in a smaller variation range than existing keyword searches. Alternative details may be found in the publication entitled "Recommending Images of User Interests from the Biomedical Literature" by Songhua Xu and Steven Clukey, published at Advanced PACS-based Imaging Informatics and Therapeutic Applications, and which is incorporated herein by reference.

In short, the recommendations are created by a pipelined system that automatically determines the interests, interests over time, and/or persistent interests of a professional or ordinary user, and extracts the most relevant content from an information corpus. The interests of a professional or ordinary user are calculated by first downloading the documents they have written or made publicly available on the internet or otherwise created in close relevance with the user, such as a journalist's report. The content of the documents is then mined to determine the person's interests (the user's personal interest profiles 308, 206) that may comprise a natural language description or a Boolean expression, for example. Finally, the user's interests are compared to the documents in a content corpus, and the most relevant documents are located and may be transmitted and rendered to the user through a client interface. Once created, the system may monitor in real-time a range of data sources and may instantly alert and deliver relevant documents or matches to the user's personal interest profiles 308, 206.

In another alternative system the front end client interfaces 102, Web server or cluster 110, and off-line server 112 may be implemented in software, encoded in a non-transitory signal bearing medium, or may reside in a memory resident to or interfaced to one or more processors or controllers that may support a tangible communication interface, wireless communication interface, or a wireless system. The memory may retain an ordered listing of executable instructions for implementing logical functions and may retain one or more engines that access files. The software is embodied in any non-transitory computer-readable medium or signal-bearing medium, for use by, or in connection with an instruction executable system, apparatus, and device, resident to system that may maintain a persistent or non-persistent connection with a destination. Such a system may include a computer-based system, a processor-containing system, or another system that includes an input and output interface that may communicate with a publicly accessible distributed network and/or privately accessible distributed network through a wireless or tangible communication bus through a public and/or proprietary protocol.

A "computer-readable medium," "machine-readable medium," "propagated-signal" medium, and/or "signal-bearing medium" may comprise a non-transitory medium that contains or stores software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection having one or more wires, a portable magnetic or optical disk, a volatile memory such as a Random Access Memory (RAM), a Read-Only Memory (ROM), an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

The term "coupled" disclosed in this description may encompass both direct and indirect coupling. Thus, first and second parts are said to be coupled together when they directly contact one another, as well as when the first part couples to an intermediate part which couples either directly or via one or more additional intermediate parts to the second part. The term "substantially" or "about" may encompass a range that is largely, but not necessarily wholly, that which is specified. It encompasses all but a significant amount. When devices are responsive to commands, events, and/or requests, the actions and/or steps of the devices, such as the operations that devices are performing, necessarily occur as a direct or indirect result of the preceding commands, events, actions, and/or requests. In other words, the operations occur as a result of the preceding operations. A device that is responsive to another requires more than an action (i.e., the device's response to) merely following another action.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method of providing personalized content recommendations, comprising:
   at an electronic device comprising a processor and a memory storing instructions for execution by the processor performing the acts comprising:
   automatically monitoring a user's information stream to identify a user's interest in a topic from a range of data sources through a publicly accessible distributed network;
   automatically generating a content signature that includes semantically salient content elements from the monitored user's information, a network address to the monitored user's information that the semantically salient content is based upon, and a plurality of densities of topics embodied in the salient content elements;
   automatically generating a personal interest profile from the monitored user information and storing the personal interest profile in a memory of the computing device, the memory stored with user's preferences based on a plurality of monitored behaviors;
   filtering items in an information stream with the personal interest profile and the content signatures; and
   transmitting only those items of information that match the user's personal interest profile to the user.

2. The method of claim 1 further comprising ranking the items of information based on a measure of an absolute relevance of the items of information to the user.

3. The method of claim 1 further comprising ranking the items of information based on a measure of an absolute relevance of the items of information.

4. The method of claim 1 further comprising ranking the items of information based on a measure of an absolute relevance of the items of information to a corpus of items of information.

5. The method of claim 1 where the personal interest profile is based on the contribution of the user to the user information.

6. The method of claim 1 where the personal interest profile comprises a plurality of objects stored in a cache in which the objects represent a interest level of the user and a disinterest level of the user.

7. The method of claim 1 where the personal interest profile comprises an object that represents a time and a temporal object that represents a user's information needs and preferences in time.

8. The method of claim 1 where the computing device comprises a mobile computing device.

9. The method of claim 1 where the computing device comprises a non-mobile computing device.

10. The method of claim 1 further comprising displaying only those items that match the user's personal interest profile.

11. The method of claim 1 where the personal interest profile is based on a user event.

12. The method of claim 1 further comprising extracting a content signature based on the monitored user information stream by modeling document level individual users' dwell times.

13. The method of claim 1 further comprising extracting a content signature based on the monitored user information stream by modeling dwell times.

14. The method of claim 1 further comprising identifying consumed content at a Web page level through a comparison of time stamps of the user's information stored in the memory.

15. The method of claim 1 where the personal interest profile comprises an aggregation of user profiles having similar characteristics.

16. The method of claim 1 further comprising automatically detecting a shift in the personal interest profile.

17. A personalized content recommendation system comprising:
   a client interface device configured to automatically generate a content signature that includes semantically salient content elements from monitored user's information data stream transmitted on a publicly accessible network without human intervention, the content signature includes a network address to the monitored user's information that the semantically salient content is based upon, and a plurality of densities of topics embodied in the salient content elements;
   a collaborative personal interest inference engine resident to a non-transient media and configured to generate automatic predictions about the interests of the user;
   a database server that retains a personal interest profile based on a plurality of monitored past behaviors; and
   a server programmed to filter items in an incoming information stream with the personal interest profile, the content signature, and programmed to identify only those items of the incoming information stream that match the personal interest profile.

18. The system of claim 17 where the server is further programmed to rank the items of the incoming information based on a measure of the absolute relevance of the items of information to the user.

19. The system of claim 17 where the server is further programmed to rank the items of the incoming information based on a measure of the absolute relevance of the items of information.

20. The system of claim 17 where the server is further programmed to rank the items of the incoming information based on a measure of the absolute relevance of the items of the incoming information stream to a corpus of items of information.

* * * * *